United States Patent Office 3,370,075
Patented Feb. 20, 1968

3,370,075
DIORGANOTIN DI(CARBOXY-ALKYLENE MONO- OR DITHIOL-CARBONATES)
Emery Parker, 290 Avenue of the Americas,
New York, N.Y. 10014
No Drawing. Filed Mar. 4, 1964, Ser. No. 349,465
2 Claims. (Cl. 260—429.7)

ABSTRACT OF THE DISCLOSURE

Organotin sulfur compounds of the composition

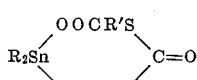

and

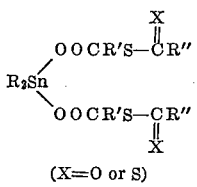

(X=O or S)

wherein R=alkyl (1–18 C), R'=alkylene (1–18 C), and R" is alkyl or alkoxy (1–18 C) are new stabilizers for chlorine containing resins.

---

This invention relates to a new class of organotin compounds and to halogen containing resin compositions stabilized with these compounds.

A great variety of sulfur containing organotin compounds have been described and recommended for the heat stabilization of polyvinyl chloride and other halogen containing polymers. The most effective sulfur containing organotin compounds are those in which the sulfur atom is directly bound to the organotin group through tin-sulfur bonds. Such compounds are generally obtained by reacting an organic compound containing one or more sulfhydryl groups with a suitable organotin compound, such as an organotin halide, oxide, or hydroxide.

One of the drawbacks of these classes of stabilizers is the rather strong unpleasant odor of the stabilizers themselves and the odor imparted to the products in which they are incorporated. It is believed that the bad odor is due to the mercapto compound which is liberated from the organotin compound during the thermal process of the polyvinyl composition.

In the compounds described in the present invention, the mercapto groups of the sulfur compounds are blocked by either thiocarbonyl or carbonyl groups and the compounds are essentially odorless due to the absence of sulfhydryl groups.

I have now found that organotin compounds containing sulfur not bound directly to tin of the organotin molecule by tin sulfur bonds, where the sulfur in the organic molecule is not a compound containing a sulfhydryl group, are in effect excellent heat stabilizers for polyvinyl chloride and other halogen containing polymers, which have the tendency to decompose during thermal processing or under the influence of heat or sunlight.

The novel organotin compounds are derivatives of thiocarbonic acids. Such thiocarbonic acids are obtained by replacing one or more of the oxygen atoms of the carbonic acid

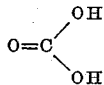

by sulfur atoms. In doing this, the following acids can be obtained:

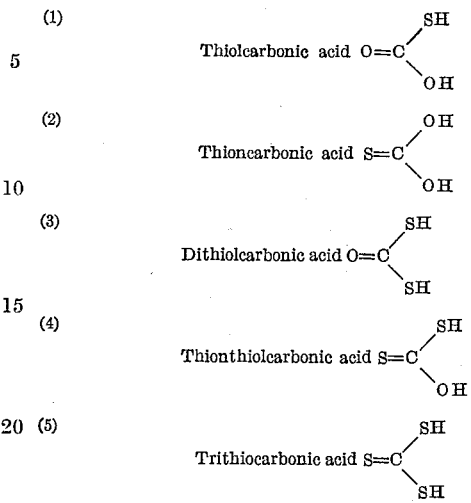

The organotin sulfur compounds of this invention correspond to the following formulae:

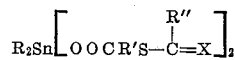

or

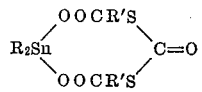

where R is an alkyl, alicyclic, or aryl group, such as for example methyl, ethyl, propyl, n-butyl, n-octyl, n-decyl, n-hexadecyl, n-hexadecenyl, allyl, phenyl, and other groups.

X is oxygen or sulfur. R" is either an alkyl group or an alkoxy group derived from an alcohol having from one to 18 carbon atoms. R' is a divalent alkylene radical such as methylene, ethylene, ethylidene, propylene, butylene or higher alkylene group having not more than 18 carbon atoms in a straight or branched chain.

The organic sulfur containing carboxylic acid derivatives are substituted compounds derived from the general class of thiocarbonic acids, in which the hydrogen atom attached to the thiol or hydroxyl group of the thiocarbonic acids is replaced by either a carboxyalkyl, alkoxy, acyl or ester group. Depending on the degree of substitution and the thiocarbonic acid chosen as starting material, the following basic type of compounds may be used to prepare the corresponding organotin derivatives.

(1) Derivatives of trithiocarbonic acid having the general formula

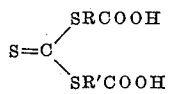

where R and R' are the same or different alkylene groups, such as for example methylene, ethylene, ethylidene, propylene, propylidene, butylene and higher aliphatic alkylene groups. Typical compounds belonging to this class of compounds are for example:

Thiocarbonyl bis thioglycolic acid

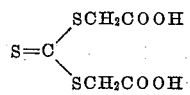

or Thiocarbonyl bis mercaptoacetic acid
Thiocarbonyl bis beta mercaptopropionic acid Thiocarbonyl bis thiolactic acid
Thiocarbonyl bis alpha mercaptobutyric acid
Thiocarbonyl bis alpha mercaptolauric acid and others (2) Derivatives of dithiolcarbonic acid having the general formula

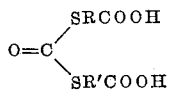

where R and R' are the same or different alkylene groups as described above. Typical compounds belonging to this class of compounds are:

Carbonyl bis mercaptoacetic acid

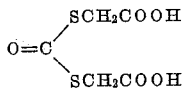

or Carbonyl bis thioglycolic acid
Carbonyl bis meta mercaptopropionic acid
Carbonyl bis thiolactic acid (3) Derivatives of thiolcarbonic acid

corresponding to the following general formula

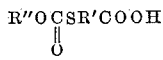

where R' represents a methylene or higher alkylene group and R'' is an alkyl, aryl or aralkyl group.

Typical compounds belonging to this group of compounds are: O-ethyl, S-carboxymethyl thiolcarbonate

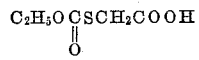

O-butyl, S-carboxyethyl thiolcarbonate, O-n-octyl, S-carboxymethyl thiolcarbonate and others.

(4) Derivatives of carbondithioic acid of the general formula

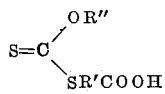

where R' is an alkylene group such methylene, ethylene, ethylidene, propylene and other higher divalent aliphatic hydrocarbon radicals R'' an alkyl or aralkyl group having more than 4 carbon atoms. Examples of this group of compounds are:

Butyl xanthyl acetic acid

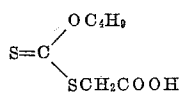

n-Octyl xanthyl propionic acid
n-Dodecyl xanthyl lactic acid
Benzyl xanthyl butyric acid and others.

The organotin derivatives of these sulfur compounds containing carboxylic acid groups may be prepared by reacting either the free carboxylic acids with a dialkyl tin oxide in an appropriate solvent or by reacting the alkali metal salt of the carboxylic acids with a dialkyl tin dihalide in an appropriate solvent. The organotin moiety of the tin compound is preferably a dialkyl tin derivative, whereby the alkyl group attached to the tin may have one to 18 carbon atoms in straight or branched chain configuration.

As the odor imparted to plasticized compositions is much more pronounced than the odor in rigid formulations of polyvinyl chloride, using the conventional type of sulfur tin compounds, the advantage in preparing plasticized essentially odorless vinyl products using the dialkyltin compounds disclosed herein as stabilizers constitutes a major advance in stabilizer technology.

Trialkyl tin derivatives of the recited sulfur containing carboxylic acid derivatives may be prepared by reacting equimolar amounts of the two reactants; these compounds may be used as fungicides.

The following examples will illustrate the invention and the new compounds, it is to be understood, however, that the examples are not to be considered as limiting the invention in any manner. Particularly, I have used butyl or octyl tin compounds because such compounds are readily available in commerce. However, it is well known in the art that the chemically inert hydrocarbon group linked to the tin atom has practically no influence on the reaction of such organotin halides, oxides, and the like with reactive organic compounds. All parts are given by weight, unless otherwise specified.

*Example 1*

46.0 g. of thiocarbonyl bis thioglycolic acid was added to 200 cc. of cold water and neutralized by adding solid sodium carbonate to a pH of 7.5. To the clear solution was added at 25 to 35° C. a solution of 60.8 g. of dibutyltin dichloride dissolved in 200 cc. of isopropyl alcohol, under vigorous stirring. A slightly yellowish precipitate was formed. More water was added to insure efficient stirring. Then the precipitate was filtered, washed with water and dried at 60 to 70° C. A slightly yellow crystalline product corresponding to the formula

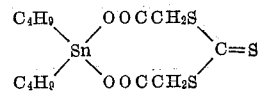

was obtained in 95% yield.

*Example 2*

22 g. of carbonyl bis thioglycolic acid was dissolved in 200 cc. of butyl alcohol, and to the warm solution 25.0 g. of dibutyltin oxide was added under stirring and heating. When the reaction was complete, the butyl alcohol was distilled off under slight vacuum and the last trace of the alcohol was removed by drying the product under vacuum. The resulting tin compound corresponded to the formula

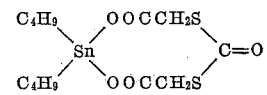

The yield obtained was 42 g.; the product was a colorless solid.

*Example 3*

To 53 g. of O-octyl, S-carboxyethyl thiolcarbonate dissolved in 400 cc. of isopropyl alcohol, warmed to 50° C., there were added in small portions under good stirring 24.9 g. of dibutyltin oxide. After the neutralization was complete, the isopropyl alcohol was removed by vacuum distillation. The remaining liquid corresponded to the formula

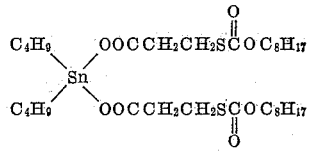

*Example 4*

To 55 g. of undecyl S-carboxymethyl thiol carbonate dissolved in 300 cc. of ethanol, there were added under stirring in small portions 24.9 g. of dibutyltin oxide. When the neutralization was completed, the alcohol was removed by distillation. The organotin compound obtained had the formula:

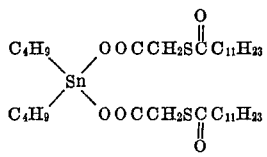

Example 5

56 g. of O-n-octyl xanthyl propionic acid were added to 500 cc. of water, and the acid was neutralized with solid sodium carbonate to a pH of 7.3. To this solution 30.4 g. of dibutyltin dichloride, dissolved in 200 cc. of isopropanol were added under stirring at room temperature. The oily liquid which separated, was washed with water and dried under vacuum. The yield was 70 g. or about 90% and the compound corresponded to the formula

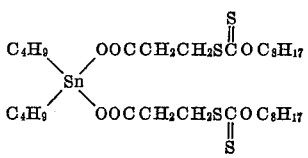

Example 6

25.4 g. of thiocarbonyl bis beta thiopropionic acid were neutralized with 8 g. of NaOH dissolved in 250 cc. of water. To this solution, there were added 42 g. of di-n-octyltin dichloride, dissolved in 200 cc. of isopropanol under good mixing. The resulting solid was filtered, washed with water and dried at 60° C. The product obtained had the formula

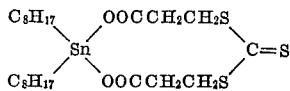

Example 7

2 g. of the organotin compound obtained in Example 1 was added to a mixture of 100 g. of polyvinyl chloride, 35 g. of dioctyl phthalate and 0.5 g. of stearic acid. The blended mixture was milled on a hot two roll mill for five minutes, until a uniform fused sheet was obtained. 2 by 2 inch squares of this clear, colorless film of about 60 mil thickness were placed in a hot air circulating oven at 170° C. After one hour exposure, the samples were still completely clear and without discoloration.

What I claim is:

1. An organotin derivative of thiolcarbonic acid of the formula

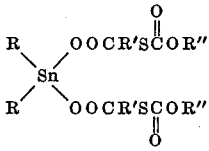

where R is a monovalent alkyl group having 1 to 18 carbon atoms, R' is a divalent alkylene group having 1 to 18 carbon atoms and R" is a member of the group consisting of monovalent alkyl and aralkyl having from 1 to 21 carbon atoms.

2. An organotin derivative of carbondithioic acid having the formula

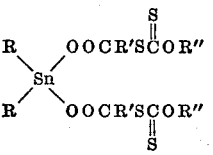

where R is a monovalent alkyl radical having 1 to 18 carbon atoms, R' is a divalent alkylene radical having 1 to 18 carbon atoms, and R" is a member of the group consisting of monovalent alkyl or aralkyl having from 1 to 21 carbon atoms.

References Cited

UNITED STATES PATENTS 3,209,017    9/1965    Hechenbleikner ____ 260—429.7

HELEN M. McCARTHY, *Primary Examiner.*

TOBIAS E. LEVOW, *Examiner.*

W. F. W. BELLAMY, *Assistant Examiner.*